United States Patent [19]
Keller

[11] Patent Number: 5,984,635
[45] Date of Patent: Nov. 16, 1999

[54] KELLER PRESSURE JET ROTOR SYSTEM

[76] Inventor: Merrill Manson Keller, 1480 Anderson St., Deltona, Fla. 32725

[21] Appl. No.: 09/138,395

[22] Filed: Aug. 24, 1998

[51] Int. Cl.$^6$ .................................................. B63H 11/12
[52] U.S. Cl. ........................ 416/20 A; 416/20 R; 416/21; 416/22; 60/39.35; 244/6; 244/7 R; 244/17.11
[58] Field of Search ..................................... 416/20 R, 21, 416/22, 20 A; 60/39.35; 244/6, 7 R, 17.11

[56] References Cited

U.S. PATENT DOCUMENTS

| | | | |
|---|---|---|---|
| 2,650,666 | 9/1953 | Dorand et al. | 416/21 |
| 3,635,426 | 1/1972 | Stanley | 244/17.11 |
| 3,843,282 | 10/1974 | Nagler | 416/20 |
| 4,189,283 | 2/1980 | McCoubrey | 416/20 A |
| 4,371,314 | 2/1983 | Dauel et al. | |
| 4,407,466 | 10/1983 | Thompson et al. | 244/17.11 |
| 4,473,335 | 9/1984 | Henry | 416/20 A |
| 4,493,612 | 1/1985 | D'Anna . | |
| 4,589,611 | 5/1986 | Ramme et al. | 244/6 |
| 4,799,859 | 1/1989 | Zimmer . | |

*Primary Examiner*—Christopher Verdier
*Assistant Examiner*—Matthew T. Shanley
*Attorney, Agent, or Firm*—Patent & Trademark Services; Thomas Zack; Joseph H. McGlynn

[57] ABSTRACT

A helicopter aircraft with an upper hollow center circular plenum in gaseous communication with a plurality of hollow hinged attached rotor blades. Below the plenum and in gaseous communication with it are two fan jet engines whose gaseous output can be inputted to the plenum and their attached hollow rotor blades through a operator controlled valve system. This same valve system can be adjusted to completely or partially by-pass the plenum and discharge the jet engines' gas to a common rear rudder located on the aircraft's to provide directional control to the aircraft when in flight. The plenum is shaped lenticular in cross section similar to an airplane wing to provide a lifting body when the helicopter is in forward flight.

8 Claims, 6 Drawing Sheets

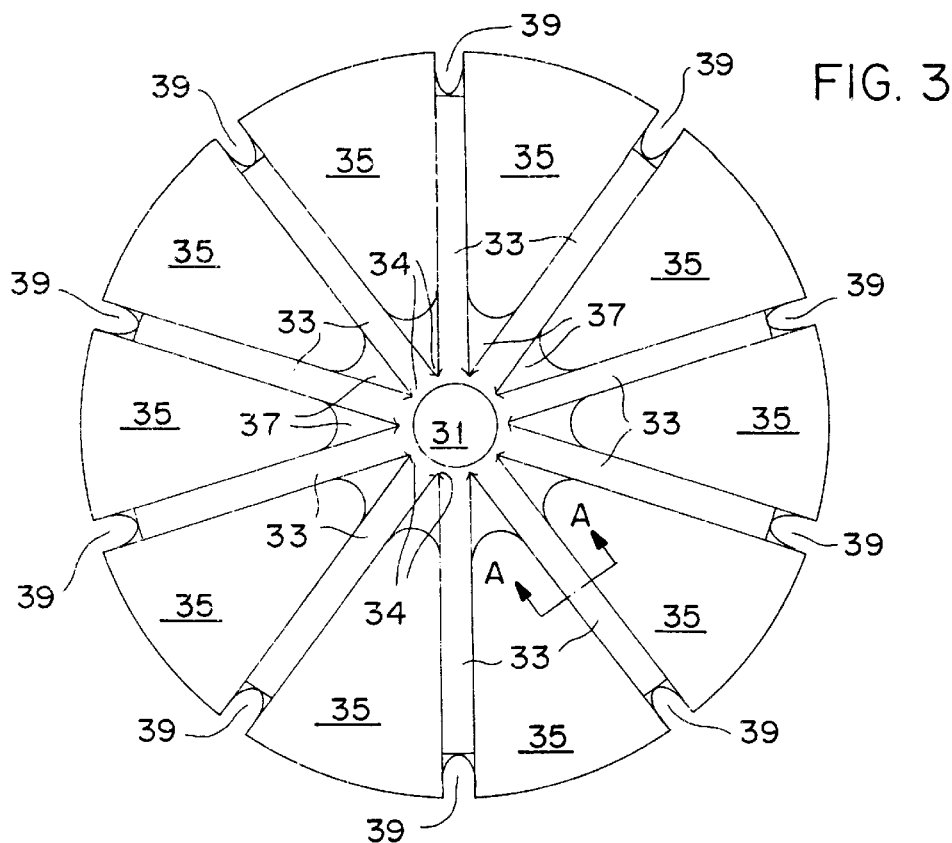
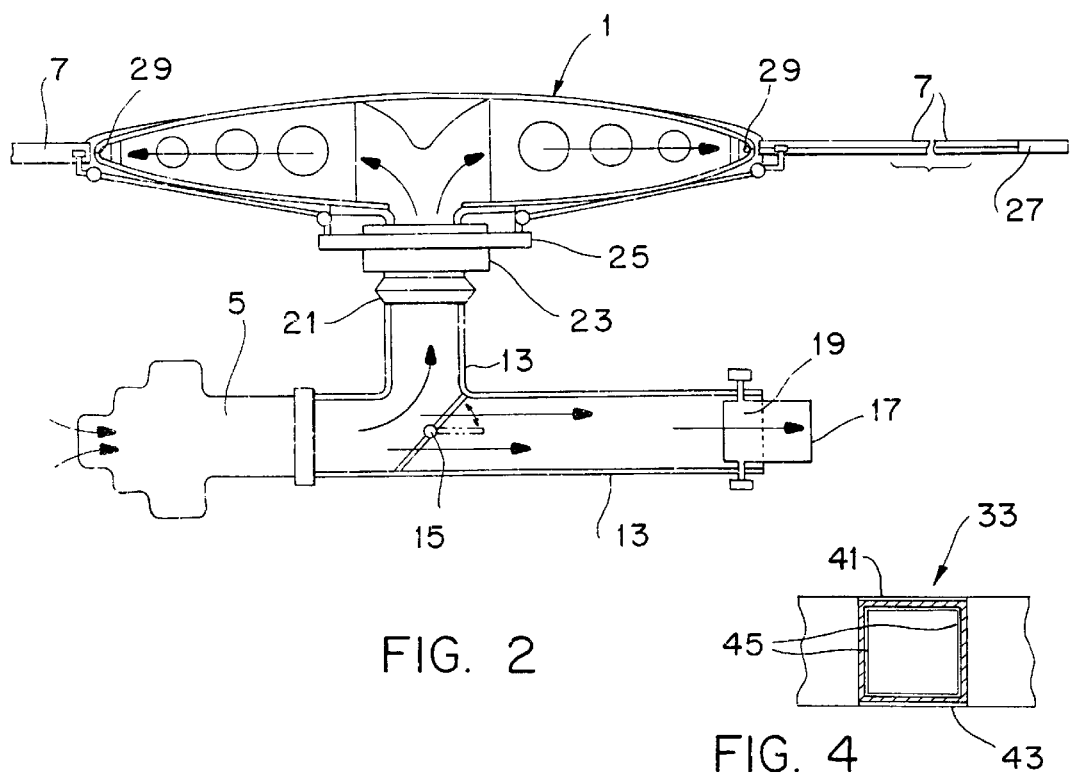

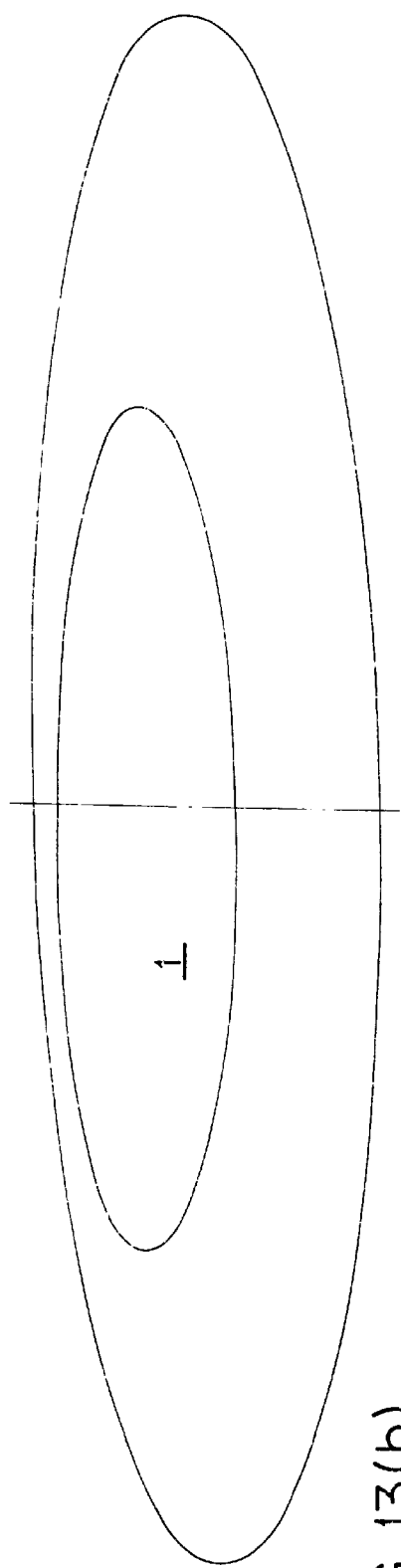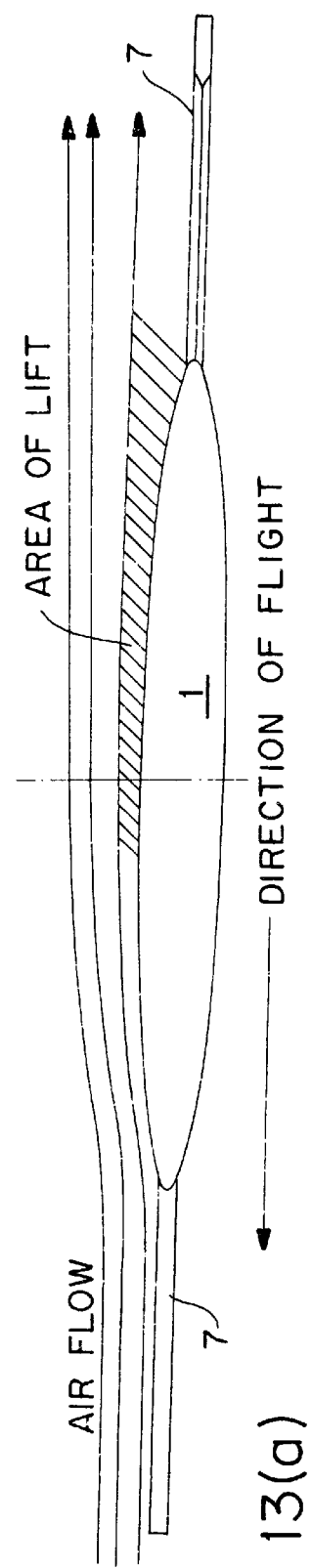
FIG. 13(b)
FIG. 13(a)

KELLER PRESSURE JET ROTOR SYSTEM

BACKGROUND OF THE INVENTION

Helicopter rotor systems with pressure jets are known. Two of the most common types operate on hot and cold cycle principles to drive the gas production, distribution and flight characteristics. In the hot-cycle type turbine gas is produced at an output of about 1200 degrees Fahrenheit (F°) which can impact severely on rotor components. The cold-cycle type of pressure-jet system is the type most investigated. With the cold-cycle type an engine drives an air compressor to provide thrust. This in effect is two engines (engine and compressor) which results in accompanying losses, lower payload, etc.

The present invention relates to a warm-cycle type of a fan-jet turbine whose gas temperature exhaust is about 480 degrees Fahrenheit (F°) which provides for a unique circular plenum that interfaces with several (e.g., ten) hollow rotor blades at its perimeter. This new plenum design replaces almost half of the inner conventional rotor blade span with a similar to manufacture blade attached by a flapping hinge. As gas pressure is proportionally exhausted aft by dump valve arrangement to move the craft forward, the plenum becomes a lifting body that unloads the blades and supports the entire machine permitting its acceleration to the limits of the blade tip compressibility. The plenum causes a gyroscopic effect to occur providing for a very air stable helicopter which is completely free of icing regardless of weather conditions.

DESCRIPTION OF THE PRIOR ART

Rotor control systems for aircraft are known. For example, the Dauel et al invention (U.S. Pat. No. 4,493,612) an air jet helicopter rotor and air distribution system of the semi-rigid type is disclosed. A teetering hinge attaches the hub to a rotatable mast shaft. Compressed air is distributed to each rotor through flexible ducts which rotate with the mast shaft. Rotatable and stationary plenum chambers are also disclosed.

In U.S. Pat. No. 4,493,612 to D'Anna a mechanically collective pitch control system is described wherein the blades are circulation controlled airfoils having injected air. The rotor system may rotates in specific situations, such as landing and taking off, and be stationary in other situations such as forward flight.

In U.S. Pat. No. 4,799,859 to Zimmer the helicopter rotor blade control has a circulation flow control and deformable control members.

The present invention provides for a manifold or plenum used with a valve system to distribute gas to a number of hollow attached rotor blades. The plenum itself acts as a lifting body while exhausted gasses propel the aircraft forward without the dependency of cyclic pitch input all as more further set forth in this specification.

SUMMARY OF THE INVENTION

This invention relates to an aircraft with a hollow center plenum in gaseous communication with a plurality of hollow attached rotor blades. Below the plenum and in gaseous communication with it is at least one turbine fan jet engine which can input gas to the plenum and rotor blades through a valve system. This same valve system can be adjusted to completely or partially by-pass the plenum and discharge the jet engine gas to a rudder located on the aircraft's rear to provide directional control.

It is the primary object of the present invention to provide for an improved helicopter having a rotor system with pressure jets.

Another object is to provide for such a system having hollow rotors in communication with a central rotating plenum into which gas from a turbine fan jet can be injected in which the plenum design assists in reducing the blade span and provides a gyroscopic effect to stabilize the system.

A still further object of this invention is to provide such a system wherein the plenum itself acts as a lifting body to permit the angle of pitch of the rotor blades to be reduced to a neutral position to allow increased acceleration to near blade tip compressibility.

These and other objects and advantages of the present invention will become apparent to readers from a consideration of the ensuing description and the accompanying drawings.

BRIEF DESCRIPTION OF THE DRAWINGS

FIG. 2 is a cross section view of one of the FIG. 1 embodiment's fan jets showing its internal connections to the plenum and its attached rotor blades.

FIG. 3 shows a top view of the internal gas communicating and distribution structure for the circular plenum.

FIG. 4 shows a cross sectional view of one of the plenum's gas conduits taken along line A—A of FIG. 3 and viewed in the direction of the arrows.

FIGS. 13(a) and 13(b) schematically show side views of the air flow over the rotor blades plenum and a perspective top view of the total plenum and rotor disc, respectively.

DESCRIPTION OF THE PREFERRED EMBODIMENT

Figure 1:
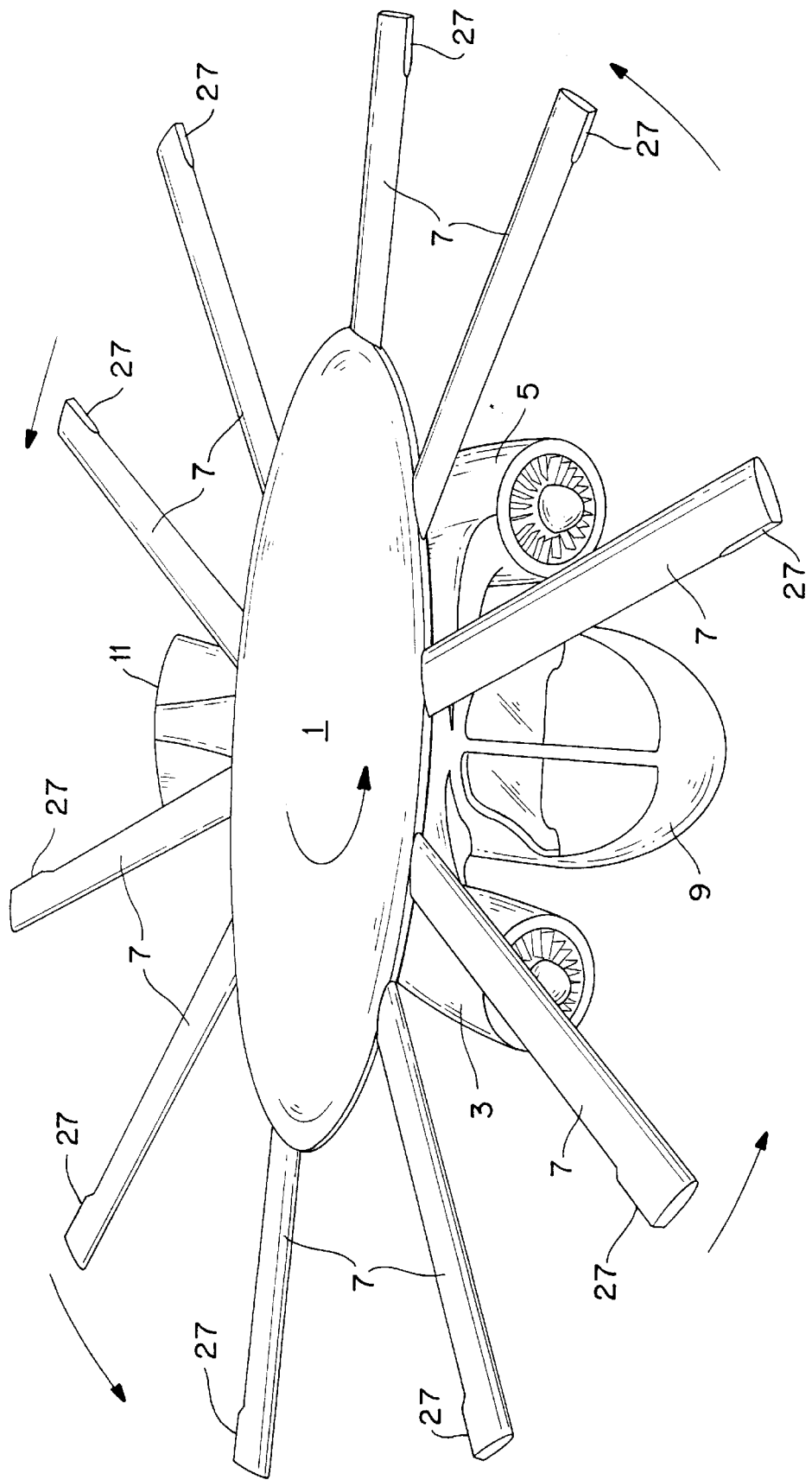
FIG. 1 is a front perspective view of the invention's preferred embodiment mounted on the body of a helicopter.

FIG. 1 is a front perspective view of the invention's preferred embodiment mounted on the body of a helicopter. The upper rotatable central plenum housing 1 has a partially hollow interior which permits air inputted into two fan-jet engines (3 and 5) to be distributed into each of the ten connected identical hollow interior rotor blades 7. Each of these identical rotor blades is equally spaced around the circular shaped plenum (when viewed from above) and attached to its perimeter by hinged connections. Below the plenum/blades and engines is a conventional operator and passenger carrying compartment 9 which houses the operator's controls for the aircraft and associated electronics. To the rear of the aircraft opposite the compartment 9, the common jet exhaust 11 for the two jet engines is partially shown. The total wing span of the blades and plenum is approximately one half the wing span distance of conventional helicopter blades.

FIG. 2 is a longitudinal cross section view of one of the FIG. 1 embodiment's two identical fan jets 5 showing its internal connections to the plenum and its attached rotor blades. Only one of the right one of the two shown opposite blades 7 is completely visible in this view. Inputted air or gas from the turbine fan jet engine 5 is sucked through internal ductwork into an attached duct system 13. This ductwork has two jointed segments one of which is directed to the plenum and the other towards the rear exhaust. Within the system in a multi-positional dump valve system 15, described in greater detail hereafter and in FIG. 12, which may divert the flow of inputted gas either totally into ductwork segment to the hollow upper plenum housing 1, or totally to the ductwork's rear segment and exit exhaust 17 or partially into the upper plenum 1 and the rear exhaust 17. Near the rear exhaust within the ductwork segment for the exhaust is the aircraft's rudder 19. When injected air impinges upon this movable operated controlled rudder the direction of the aircraft's flight may be changed.

The plenum hollow housing 1 is jointed to the lower vertical ductwork segment 13 via a gas seal 21 above which are bearings 23 and the still higher swash plate 25. The plenum housing 1 is made of a spun stainless steel material and shaped with a pitch that is higher in the center and narrower where it joins the hollow rotor blades 7 at its periphery. An internal rib structure in the plenum permits the distribution of gas into each of the hollow blades and through their hollow lengths until exiting from their free end orifices 27 (see FIG. 1). This pressurized injected air causes the plenum and its rotor blades to rotate counterclockwise as shown in FIG. 1. Also depicted in FIG. 2 are the hinged connections 29 between the hollow rotor blades and the center plenum.

FIG. 3 shows a top view of the internal gas communicating and distribution structure for the circular plenum 1. A central plenum mast opening 31 receives gas from the fan jet engines through the vertical section of the connected ductwork 13. From this central location the gas is distributed to each of the ten attached rotor blades 7 (see FIG. 1) through connected box conduits 33 joined to end openings in the blades. Each conduit 33 is equally spaced and thus separated 36 degrees on center from its adjacent similar conduit. Between the equally spaced conduits 33 on the plenum's top and bottom are triangular sheet metal removable panels or fairings 35. These fairings may be removed for access to the plenum's interior and for installing any desired controls or to inspect the plenum. The hot gasses from mast opening 31 are deflected radially to the box conduits by conical stainless steel deflectors 34 or defusers. The outside surface of the plenum is constructed with rivets, bolts and fasteners installed flush with the plenum's outside surface to provide a smooth airfoil contour. A top plate gusset 37 fits around the central mast opening 31 and intervening conduits 33 to help in sealing the system from gas leakage when the plenum and its components rotate. At the ends of each of the conduits 33 is a opening 39 to permit blade cuff movement.

FIG. 4 shows a cross sectional view of one of the plenum's gas conduits 33 taken along line A—A of FIG. 3 and viewed in the direction of the arrows. Each of the square in cross section gas conduits 33 have an upper load stainless steel bearing plate 41 and a lower or bottom load stainless steel bearing plate 43. Each of these upper and lower conduit plates interconnect adjacent plates on blade conduits to form a continuous centrifugal tension carrying structure. About the entire four sides of conduit 33 perimeter is a blanket duct insulating aluminum sheet material 45.

Figure 5:
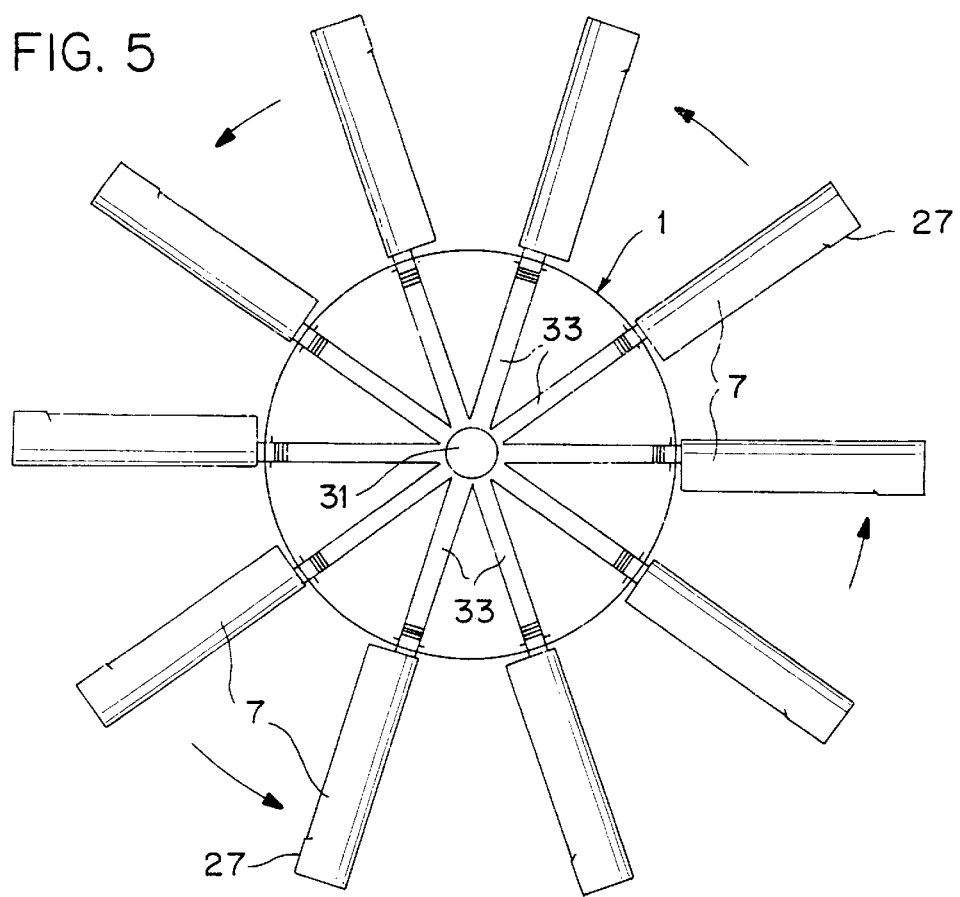
FIG. 5 is a top internal view of the plenum showing it attached to the rotor blades.

FIG. 5 is a top internal view of the plenum showings it attached to the rotor blades. Heated gas emit from mast opening 31 is conveyed through each of the ten radial conduits 33 into the internal conduits running the length of each rotor blade until the gas exist from tip blade orifices 27 (see FIG. 1). This movement of gas causes the blades and its attached plenum to rotate in counterclockwise direction as shown by the arrows.

Figure 6:
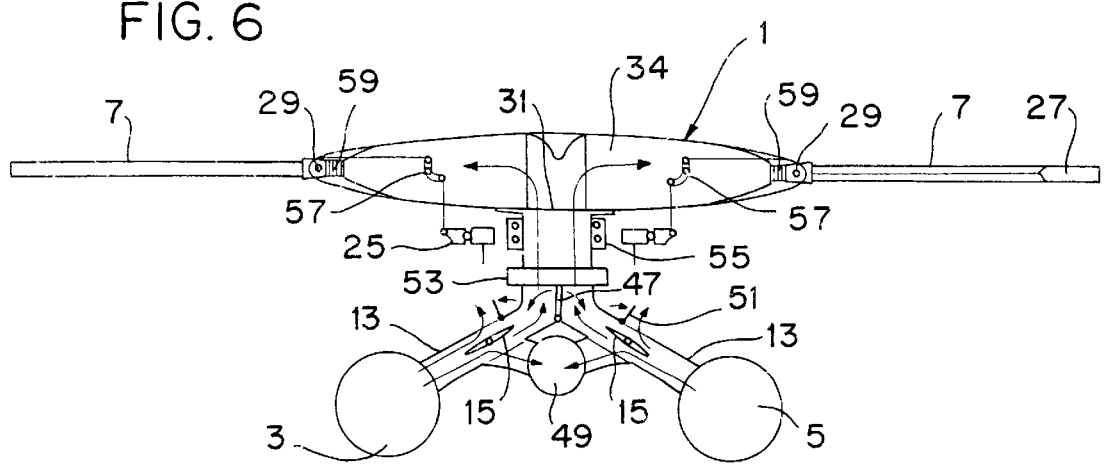
FIG. 6 is a front cross section view of the FIG. 1 embodiment's fan jets showing their internal connections to the plenum and the attached rotor blades.

FIG. 6 is a front cross section view of the FIG. 1 embodiment's fan jets showing their internal connections to the plenum and its attached rotor blades. For simplicity purposes the operator and passenger carrying compartment 9 have been omitted from this figure. The two separate fan jet engines 3 and 5 are connected by their own separate ductwork 13 each with its own internal dump valve system 15 to a single engine out valve 47. Below and between this intersecting duct works are the aircraft's tailpipe 49. A gas overboard gate 51 also appears on the upper part of both duct works 13 and there is a upper gas seal 53 above where the ductwork joins together. Also visible in this figure are the swash plates 25 and the two mast bearings 55. Linked to each of the swash plates is a blade pitch control 57 used to control the amount of rotor pitch via a hinged connection and a push rod and linkage system. One of the gas diffusers 34 (see also FIG. 3) is also depicted above the manifold mast opening 31. Where the rotor blades join the plenum there are hinge connectors 29 next to the inflatable bellows 59.

Figure 7:
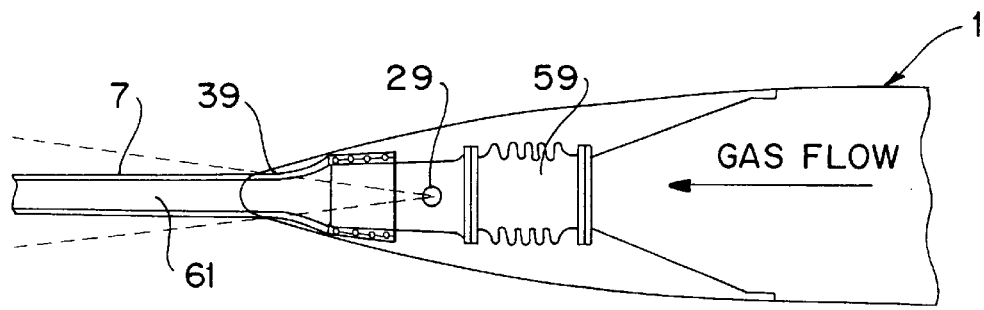
FIG. 7 is a side internal view of the plenum where attached to a rotor blade.

FIG. 7 is an enlarged side internal view of the plenum section where attached to one of the rotor blades 7. The rotor's hinged connector 29 has the inflatable stainless steel bellows 59 (see also FIG. 6) immediately before the connector in the gas flow pattern. As the bellows expands it fills up expanding outwardly while the gas flow through its hollow center part into the hollow interior portion 61 in the rotor blade. The bellows connection to the remainder of the plenum provides for a flexible connector as the blade pivots on its hinged connection is a flapping motion up and down within the limits as shown by the dotted lines. This blade flapping action is limited by the size of the cuff opening 39 and the hinge 29 to the internal structure of the plenum.

Figure 8:
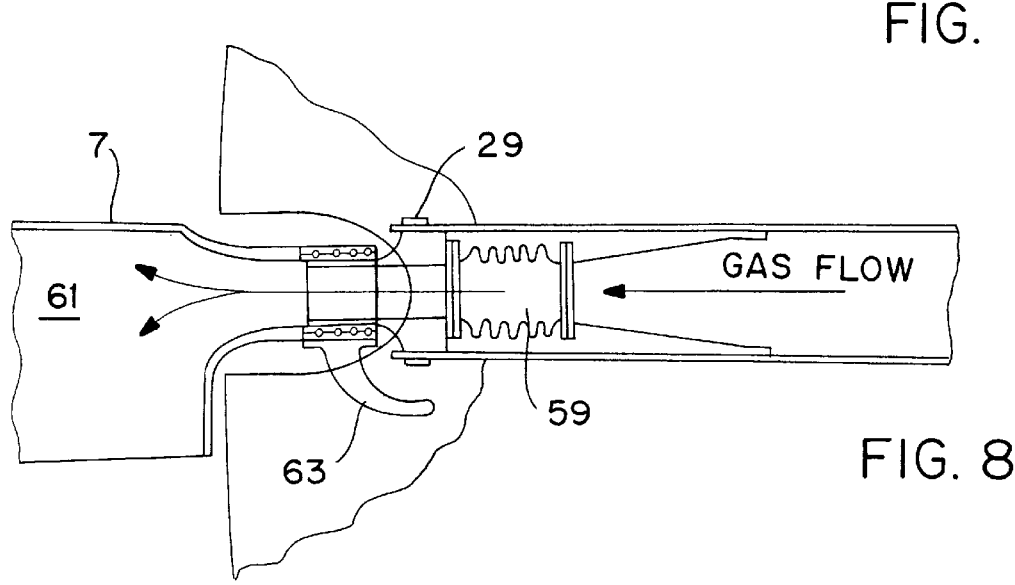
FIG. 8 is a bottom internal view of the same plenum shown in FIG. 7 where attached to a rotor blade.

FIG. 8 is a bottom internal view of the same plenum section shown in FIG. 7 where attached to a rotor blade. As gas enters the hollow interior 61 of the blade 7 there is a blade pitch change horn 63 which are connected to the push-pull control rods 60. This horn is mounted on the gas duct (see FIG. 9). Gas enters the plenum center and flows only in the gas duct to the blades. This horn 63 is like a flap valve and is used to divert the flow pattern to change the rotor's pitch with respect to the plenum.

Figure 9:
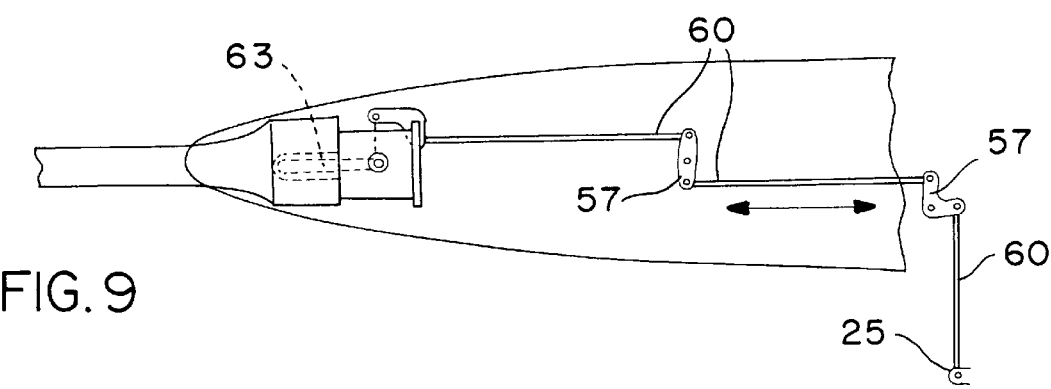
FIG. 9 is a side view of the outside linkage plenum where attached to a rotor blade that is used to control movement of the blade.

As better shown in the FIG. 9 side view of the outside linkage plenum, the mechanical linkage to change the horn 63 consists of a system of push-pull rods 60 and bell cranks members 57 whose pulling or pushing (see arrows) will rotate the pivotally connected horn 63. The end of the link members 57 is attached to the swash plate 25 via a push rods connection attached to a rotor blade that is used to control movement of the blade.

Figure 10:
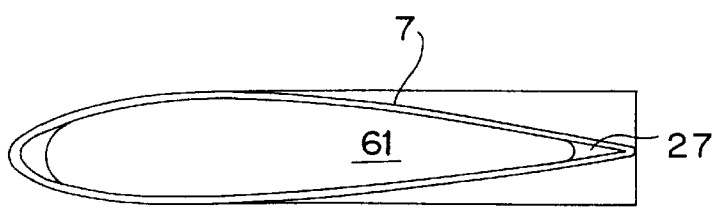
FIG. 10 is a longitudinal cross section view of a rotor blade.

FIG. 10 is a cross sectional view of the rotor blade 7. Essentially the stainless steel rotor blade is configured like an airplane wing (lenticular or shaped like a double-convex lens) with the internal hollow cavity 61 running along its length. Near the blade's free end is the orifice tip 27 (see FIG. 1). The blade's feather axis is 27% and its chord extends as shown.

Figure 11:
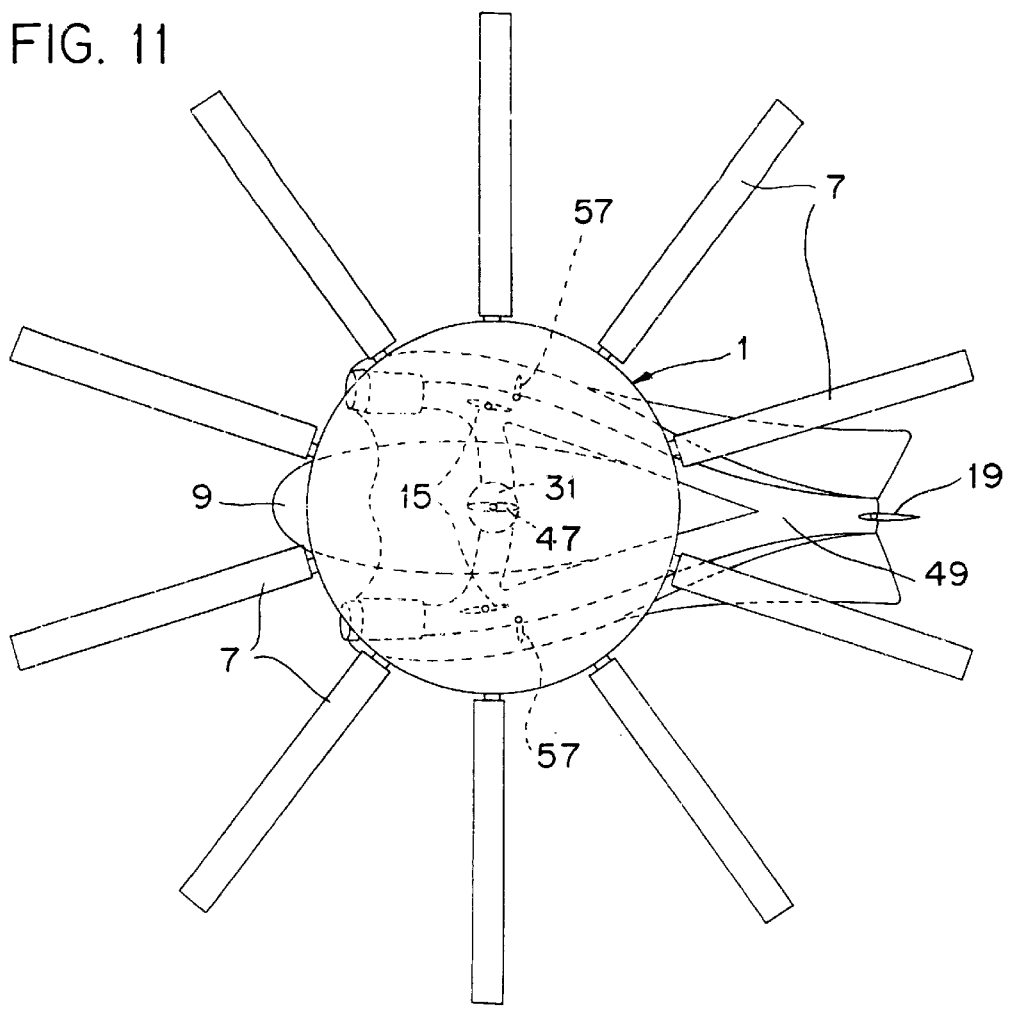
FIG. 11 is a top view of the helicopter showing its plenum, jet fan engines, rotor blades and internal gaseous communication system from the engines to the plenum and rotor blades.

FIG. 11 is a top view of the helicopter showing its plenum, jet fan engines, rotor blades and internal gaseous communication system from the engines to the plenum and rotor blades. All the components within the circular plenum are shown in dotted line format and represent the different internal gas communication system part previously mentioned. Included are the two internal dump valve systems 15 (see also FIG. 2) whose conduits join together into a single exhaust conduit with rudder 19. Above this gas conveying system is the vertical ductwork with exit mast opening 31 and its one engine out valve 47 (see FIG. 6). The operator's and passenger compartment 9 underneath the engines and plenum is partially shown in this FIG. 11.

Figure 12A:
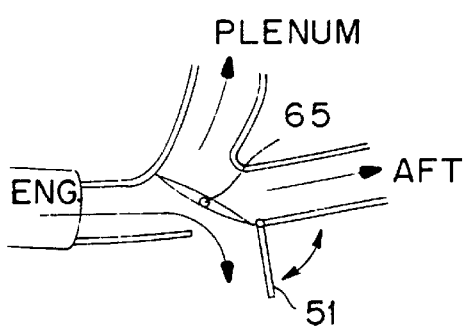
FIGS. 12(a)–(c) are internal side views of one of the two dump valves shown in three different gas distribution controlling positions.
Figure 12B:
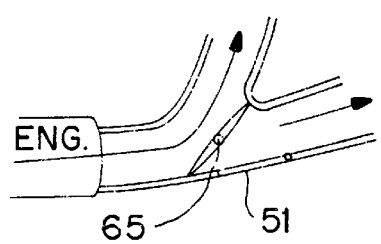
Figure 12C:
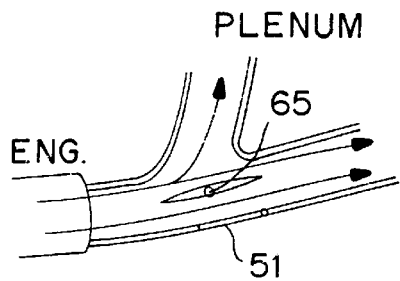

FIGS. 12(a)–(c) are internal side views of one of the two dump valves systems 15 shown in three different gas distribution controlling positions. In the first position, FIG. 12(a), heated gas from the fan jet engine is being dumped overboard since the dump valve 65 blocks the passageways to the plenum and the aircraft's aft while the gas overboard valve 51 is opened to the ambient air. The second figure, FIG. 12(b), has the valve 51 closed and the valve 65 positioned to block the passage of gas to the aft. Thus, all of the gas goes into the plenum 1 in this position for distribution to the rotors and turning them. Normally, this would occur when the aircraft is being lifted from the earth. In the last position, FIG. 12(c), valve 51 remains closed and valve 65 is oriented to permit some of the gasses from the engine to flow to the plenum and also to the aircraft's aft. In this last position the rotors are rotating while the jets propel the aircraft forward at the same time. By controlling the orientation of the rudder 19 the aircraft's direction may be altered while providing more gas to the plenum would provide more lift or less as the case may be. Diverting all jet engine gases from the aircraft via valves 51 will result in no lift or forward propulsion to the aircraft.

Clearly the described invention presents several advantages over the art. The omission of a rotor head, as such, and replacing it with the circular lenticular plenum having a diameter that occupies the inner forty percent of the rotor disc and interfaces with the ten hollow rotor blades allows the distribution of driving gas to a greater number o blades than is possible with a conventional hub. Using multi-blades are needed to utilize the full volume of turbine gasses without encumbering blades of a lesser number. The result is a blade system approximating the blade stresses (weight, centrifugal, torsional, etc.) of a conventional five blade system which is simpler to manufacture. The ten blades used in this invention have a simple flapping hinge connection with the plenum-gas-blade interface being accomplished by a stainless steel bellows.

As illustrated in FIGS. 13(a) and (b), other unique features of the present invention include the use of a stainless steel and aluminum sheet metal circular (see FIGS. 13(a) and (b) views) plenum 1 that in lenticular in cross section and constructed much like an airplane wing such that the plenum itself a lifting body in forward flight. The FIG. 13(a) air flow side view schematically illustrates this lifting effect of the plenum. Using ten hollow stainless steel blades vertically hinged to flap and interfaced at 36 degrees radially about the plenum center provide a total blade span approximately one half the span of conventional blades thus greatly reducing root stress while being simple to manufacture (no twist). The forward flight does not depend upon cyclic pitch input as is necessary in conventional helicopters, although this invention can be flown in the same manner. The rearward exhausted gasses propel the aircraft forward instead of cyclic pitched blades pulling the craft forward. This allows the aircraft to accelerate in excess of 200 kts since there is no retreating blade stall. And due to the strong gyroscopic effect of the rotating plenum and its numerable blades this system is the most stable and vibration less of any known other. Lastly, in addition to eliminating the bane of transmission, and the tail rotor with their many accessories this system is the only one completely ice free.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. An jet power helicopter aircraft with a rotor and gas distribution system comprising:

a jet power helicopter aircraft;

at least one fan jet engine attachable to said helicopter aircraft and adapted to output a supply of heated gas;

a hollow rotatable plenum forming part of said aircraft and adapted to be in gaseous communication with the output of the heated gas from said jet engine, said plenum being generally similar in cross sectional shape to an airplane wing and lenticular in cross section to act as a lifting body for the aircraft when in a forward flight motion;

at least six rotor blades equally spaced around and hingedly mounted on said plenum around the plenum's perimeter, each of said blades having internal gas conduits extending substantially the blades, entire length that are in gaseous communication with the plenum; and a valve system in said aircraft for directing gas outputted from the jet engine to the aircraft's plenum and to the attached rotor blades.

2. The jet power helicopter aircraft with a rotor and gas distribution system as claimed in claim 1, wherein said plenum is generally circular in shape when viewed from above and there are at least eight rotor blades each mounted and equally spaced around the plenum's periphery approximately the same distance apart from each other.

3. The jet power helicopter aircraft with a rotor and gas distribution system as claimed in claim 1, wherein there are two fan jet engines attached to the aircraft having a common output housing in which a gas deflector rudder is mounted.

4. The jet power helicopter aircraft with a rotor and gas distribution system as claimed in claim 3, wherein said valve system includes two separate gaseous deflector valves located in a conduit system leading to the plenum from the outputs of each of the engines.

5. The jet power helicopter aircraft with a rotor and gas distribution system as claimed in claim 4, wherein each of said rotor blades has a free end and is hollow, each blade having a gas orifice located near the blade's free end.

6. The jet power helicopter aircraft with a rotor and gas distribution system as claimed in claim 5, wherein each of said rotor blades have outer surfaces that are lenticular in cross section.

7. The jet power helicopter aircraft with a rotor and gas distribution system as claimed in claim 6, wherein there are ten rotor blades each mounted and spaced around Plenum's periphery approximately 36 degrees apart from each other.

8. The jet power helicopter aircraft with a rotor and gas distribution system as claimed in claim 7, wherein each of said rotor blades is mounted to the plenum by a hinged mount with an adjacent bellows input.

* * * * *